(12) United States Patent
Peng et al.

(10) Patent No.: US 6,252,671 B1
(45) Date of Patent: Jun. 26, 2001

(54) SYSTEM FOR DOWNLOADING FONTS (75) Inventors: Xiantu Peng, San Jose, CA (US); John A. Patterson, Longmont, CO (US); Matthew A. Jacobs, Saratoga, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/083,594

(22) Filed: May 22, 1998

(51) Int. Cl.$^7$ .................................................... B41B 15/00
(52) U.S. Cl. .................... 358/1.11; 358/1.1; 358/1.12; 358/1.13; 358/1.14; 358/1.15; 358/1.16; 358/1.17
(58) Field of Search ................... 358/1.11, 1.13, 358/1.15, 1.16, 1.17, 1.1, 1.12, 1.14

(56) References Cited

U.S. PATENT DOCUMENTS

| | | | |
|---|---|---|---|
| 4,907,282 | 3/1990 | Daly et al. ................................ | 382/9 |
| 4,931,960 | 6/1990 | Morikawa ............................ | 364/519 |
| 5,410,639 | 4/1995 | Gruel .................................. | 395/102 |
| 5,579,449 | * 11/1996 | Strobel ................................ | 358/1.11 |
| 5,602,976 | 2/1997 | Cooper et al. ....................... | 395/116 |
| 5,771,034 | * 6/1998 | Gibson ................................ | 345/141 |
| 6,031,622 | * 2/2000 | Ristow et al. ....................... | 358/1.11 |

* cited by examiner

Primary Examiner—Edward Coles
Assistant Examiner—Twyler Lamb
(74) Attorney, Agent, or Firm—Fish & Richardson P.C.

(57) ABSTRACT

An apparatus and a method transmits a font available on a computer to an output device supporting a page description language with a download format. The apparatus determines whether a character set associated with the font can be represented in a byte and if so, downloads the font to the output device using a first font format. Otherwise, the apparatus determines whether the number of glyphs in the font is below a threshold and if so, downloads the font to the output device using the page description download format and otherwise breaks the font glyph data into one or more blocks of glyph data, each of which having fewer glyphs than the threshold. Once broken up, the apparatus downloads the blocks to the output device using the download format and stitches the blocks together during a subsequent font reassembly in the output device.

39 Claims, 9 Drawing Sheets

ORIGINAL

```
GLYPH 1        (SIMPLE)
GLYPH 2        (SIMPLE)
GLYPH 3        (COMPOSITE)  (15000, 150001)
GLYPH 4        (COMPOSITE)  (15000, 150001)

GLYPH   15000    (SIMPLE)
GLYPH   15001    (SIMPLE)
GLYPH   15002    (COMPOSITE) (1,2)
GLYPH   15003    (COMPOSITE) (1,2)
```
400

SYSTEM FOR DOWNLOADING FONTS

BACKGROUND

The invention relates to the transmission of fonts to a hardcopy device. More particularly, the invention relates to the transmission of fonts to a hardcopy device using a page description language.

Continual advances in computer technology are making possible cost-effective computers capable of displaying images and text at high resolution. Concurrently, user friendly operating systems with a graphical user interface (GUI) have been developed to take advantage of computer hardware. These operating systems support multiple fonts which allows users to be more proficient and effective at tasks such as desktop publishing.

The multi-font capability on GUI operating systems in turn is driving the demand for high resolution hard copy devices or printers. Typically, a computer sends data to a hard copy device such as a printer in the form of characters or images to be printed. For characters, the printer receives the character data and places ink onto a sheet of paper in accordance with glyphs associated with the characters. Glyphs are objects which specify exact shapes of characters. In this context, a font is a collection of glyphs, all of a similar design.

Early printers had a limited number of fonts and characters in their character generators. The characters were typically laid out in matrix structures known as bitmaps, or rectangular arrays of bits where each bit represents a pixel that may be turned on during the generation of that character onto paper. Originally, the bitmaps were stored in Read Only Memory (ROM) devices. However, as only a fixed number of fonts may be supported by the ROM device, Random Access Memory (RAM) devices were added to allow fonts to be downloaded from the computer to the printer. To provide more flexibility and higher quality output, page description languages were developed whereby a page with graphics, text, and images that may be positioned anywhere on the page, and in any order, is represented using successive commands of the page description language.

One popular page description language is the PostScript® page description language available from Adobe Systems, Inc. of San Jose, California. The PostScript® page description language is described in more detail in a document entitled *PostScript Language Reference Manual*, 2d. ed. (1993), available from Adobe Systems, Inc., and hereby incorporated by reference. In PostScript® compatible printers, after receiving the commands, a desired image is rasterized so that a print engine in the printer can generate the page by turning on or off a series of individual dots or pixels across the printed page in a raster scan line.

In certain personal computers which work with a Microsoft Windows 95® operating system available from Microsoft Corporation of Redmond, Washington, applications may specify a host system font such as a TrueType font or a PostScript® font. During printing, the TrueType or PostScript® line layout determination requires accesses to font specific glyphs and thus these glyphs need to be downloaded to the printer. Generally, when an application sends glyph data with the host font to a PostScript® compatible printer, software drivers on the computer may convert host font glyphs into unscalable bitmaps, unhinted outlines, or native TrueType or PostScript® font data into PostScript® formatted data. The driver software may analyze glyph usage within a document, determine glyph dependencies, and send only the glyphs required for the current print job to the printer. However, such an approach may require a significant amount of host memory storage and processor capacity. Moreover, such an approach may greatly increase the amount of data being sent to the printer. As such, the printer may require a substantial amount of memory to handle the data stream generated by the computer. Such memory requirements may also cause the software driver to free previously used memory in the printer in order to allocate space for the additional glyphs. However, in the event that subsequent commands access a released glyph, the released glyph must be resent to the printer. Hence, the computer and the printer's throughputs may be substantially reduced.

SUMMARY OF THE INVENTION

In accordance with the present invention, an apparatus downloads a font available on a computer to an output device which supports a page description language such as PostScript®. The page description language has a page description language download format for supporting complex fonts. The apparatus determines whether a character set associated with the font can be represented as a byte and if so, downloads the font to the output device using a first format. Otherwise, the apparatus determines whether the number of glyphs in the font is below a threshold such as $2^{14}$ (16K) glyphs and if so, downloads the font to the output device using the page description download format. Otherwise, the apparatus breaks the font glyph data into one or more blocks of glyph data, each of which having fewer glyphs than the threshold. Once the glyphs have been broken into small blocks, the apparatus downloads the blocks to the output device using the page description language download format. The output device then stitches the blocks together during a subsequent font reassembly.

In one aspect, the apparatus creates PostScript® CIDFont character maps and CIDFont fonts according to vertical or horizontal line layouts of the font available from the operating system. CIDFont character maps and CIDFont fonts are created which support glyph-index based access and character based access. Further, the apparatus creates glyph-ordered vertical and horizontal fonts, as well as character ordered vertical and horizontal fonts.

In another aspect, the apparatus duplicates composite glyphs referenced in a current block but residing in other blocks into a buffer in the current block. Glyphs in the current block as well as the buffer are combined or "stitched" together. The stitching of non-resident referenced composite glyphs together with glyphs in the current block allows all composite glyphs to be defined, even when they reside outside of the current block.

In yet another aspect, unique identification information is generated for each font so that the printer can cache glyphs across print jobs for faster printing. The identification information is also accessible to a printer driver in the computer so that the driver can readily determine whether a version of a downloaded font matches a version on the computer.

In another aspect, the apparatus compresses glyph data before downloading the font-data. The compression may be performed by encoding the font as ASCII85 encoding.

In another aspect, the method transmits the font available on a computer to the output device supporting a PostScript® page description language by breaking the font glyph data into one or more blocks of glyph data; downloading the blocks to the output device using the PostScript® CIDFont format; and in the output device, stitching the referenced composite glyphs together with glyphs in the current block to define all composite glyphs.

Advantages of the present invention include the following. The present invention supports TrueType fonts on a PostScript® compatible printer in a manner that minimizes memory requirements on the printer. Moreover, only a small print file needs to be sent from the computer to the printer. Additionally, the present invention reduces unnecessary or duplicative transmissions data of glyphs in printing TrueType characters. The amount of unnecessary processing is reduced so that the computer may be more responsive to other application's needs. Similarly, the reduced processing and data storage requirements on the printer maximize the printer's effectiveness in serving a wide range of applications.

DESCRIPTION

Figure 1:
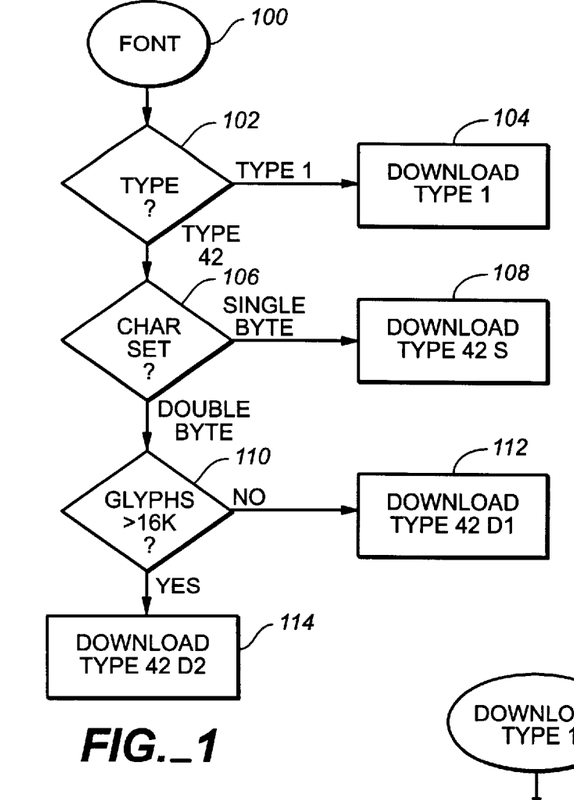
FIG. 1 is a flow chart of a process for downloading fonts to a printer.

Referring now to FIG. 1, a flow chart illustrating a process 100 for downloading fonts from an operating system such as a Windows-95™ operating system to a printer such as a PostScript® printer is shown. The process 100 initially determines whether the font is a Type 1 font or a Type 42 font. The Type 1 font is a PostScript® font, while the Type 42 font is a TrueType font. If the font is Type 1 font, the process proceeds to download the Type 1 font (step 104) as discussed in more detail in FIG. 2. If the font is a Type 42 font, the process 100 proceeds to determine whether the character set is single byte or double byte (step 106). The determination of whether the Type 42 font is a single byte or a double byte character set dictates whether the font will be treated as a PostScript® CIDFont, which is a format for handling complex languages that would require a large number of glyphs and which is generally used for Asian language fonts. If the character set is single byte, the process 100 downloads a Type 42S font (step 108) as shown in more detail in FIG. 3. Alternatively, if the character set requires two bytes of storage per character, the process 100 proceeds to step 110 where it further checks whether the number of glyphs are greater a predetermined threshold value such as 16,384 (16K). If less than 16K glyphs are needed by the font, the process 100 proceeds to download a Type 42 D1 font (step 112) where it is transmitted as a TrueType font using a PostScript® CIDFont format. However, the CIDFont format has a limitation in that it can handle at most 16K glyphs at a time. Thus, if more than 16K glyphs are required, the process 100 downloads a Type 42 D2 font (step 114) where the font is broken into discrete blocks, each of which with fewer than 16K glyphs, and each block is transmitted to the printer in accordance with the PostScript® CIDFont specification. Generally, the fonts are downloaded in steps 104, 108, 112 and 114 using compression methods which are compatible with all transport layers of the PostScript® printer. In one embodiment, the fonts are downloaded using ASCII85-Encoded data. However, alternate compression methods available in the PostScript® interpreter, such as those deploying lossless filters, may be used as well.

Figure 2:
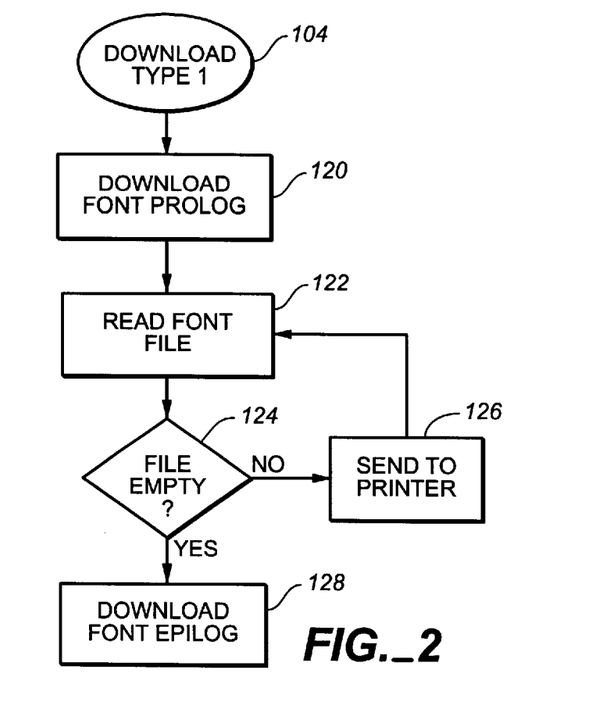
FIG. 2 is a flow chart showing in more detail a process for downloading Type 1 fonts.

Referring now to FIG. 2, the process to download the Type 1 font of FIG. 1 is illustrated in more detail. The downloading of the Type 1 font is relatively straightforward as the font's internal structure is already described in the PostScript® language. The process 104 initially downloads a font header or prolog (step 120). The font prolog instructs the printer to store the font and keep the font resident in the printer. Next, the process 104 reads a font file (step 122). The processing of the font file continues in step 124 where it checks whether the file is empty. If not, the read font file is sent to the printer (step 126) and the read font file step 122 is repeated. Once the file downloading process completes operation in step 124, the process 104 downloads a font epilog (step 128). An acknowledgment from the font epilog download step 128 allows the computer to confirm that the printer has successfully completed the font downloading operation, among others.

Figure 3:
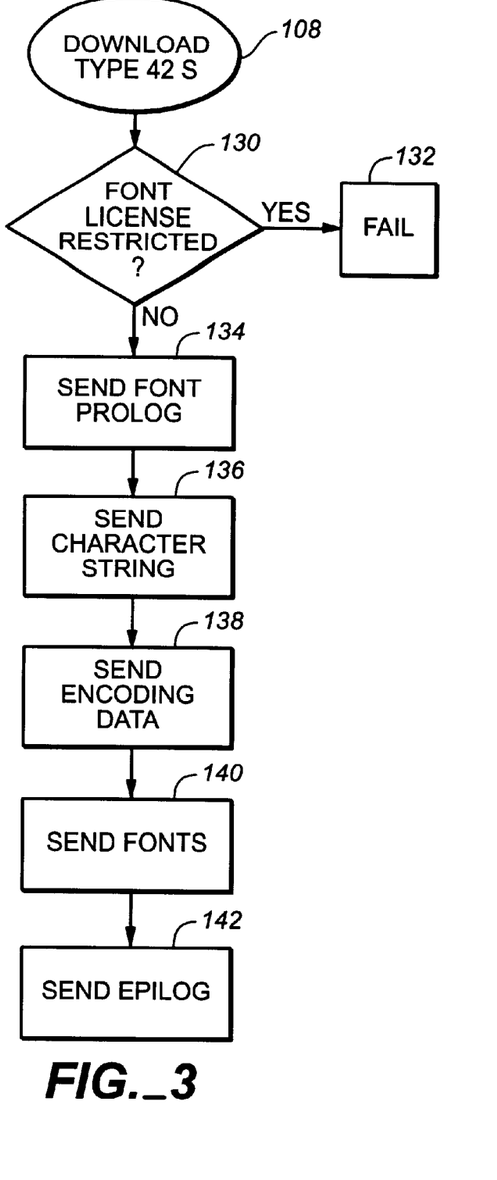
FIG. 3 is a flow chart illustrating in more detail a process for downloading Type 42S fonts.

Turning now to FIG. 3, the process 108 of FIG. 1 to download a Type 42S font is illustrated in more detail. First, the process 108 determines whether a user font license is available (step 130). If a font license is not present, the process 108 indicates a failure and exits (step 132). Alternatively, the process 108 proceeds from step 130 to step 134 where it sends a font prolog to the printer to determine precisely which fonts have already been downloaded to the printer. The font prolog send step 134 also generates a unique identification value known as XUID for each font already resident on the printer. The XUID value is computed by generating checksum values from three TrueType specific tables, a location table (LOCA), a table containing actual data on how the ink for the particular glyph is placed on the paper (GLYF), and an OS/2 and Windows font related table (OS/2). The XUID unique identification information is generated for each font so that the printer can cache glyphs across print jobs for faster printing. The identification information is also accessible to a printer driver in the computer so that the driver can readily determine whether a version of a downloaded font matches a version on the computer.

Next, a character set is sent (step 136) to the printer. Additionally, the process 108 also sends an encoded character set data to the printer (step 138). As explained in more detail in FIG. 6, step 138 selects the encoding type used to transfer the font data to the printer from three types: a predefined encoding type, a standard encoding type, and a byte encoding type [0 . . . 255]. Additionally, the process 108 sends Soft Font (SFNTS) information (step 140) necessary for emitting the glyphs, as shown in more detail in FIG. 5. Finally, the process 108 sends an epilog (step 142) to the printer to confirm a proper reception of the downloaded font.

Figure 4:
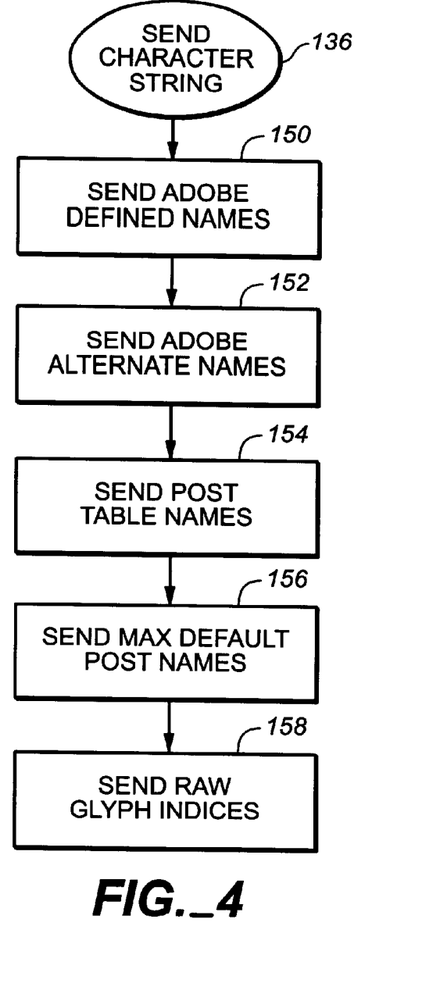
FIG. 4 is a flow chart illustrating in more detail a process for sending character sets.

Referring now to FIG. 4, the character sending step 136 of FIG. 3 is shown in more detail. The process of FIG. 4 ensures that, in the event that a particular character may be referenced using a plurality of names, that all possible naming incarnations of that character are flagged so that the proper character may be properly referenced regardless of the name that the application software or the driver software may use in referring to the character. The process 136 sends various predetermined names such as Adobe-standard names to the printer (step 150). Next, it sends one or more alternate names to the printer (step 152). Further, PostScript® table names are sent in step 154 before the process 136 sends a maximum number of default PostScript names to the printer (step 156). The process 136 then sends raw glyph indices to the printer (step 158). The glyph indices are supplied to handle the possibility that a particular application may directly request the glyph number associated with a character rather than requesting the character itself. In this event, the glyph indices are used to properly retrieve raw glyph data from a font.

Figure 5:
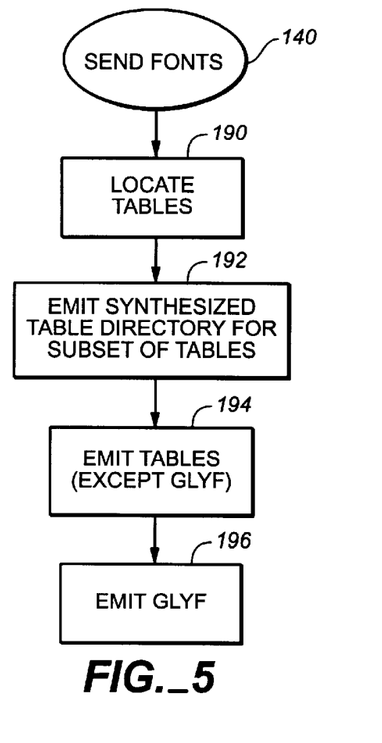
FIG. 5 is a flow chart illustrating a process for sending fonts.

Turning now to FIG. 5, the send font step 140 of FIG. 3 is illustrated in more detail. The data sent includes all information that the PostScript® interpreter needs to render ink on the page. Additionally, support information such as a character mapping may be included. Upon entry to the step 140, tables associated with a top-level directory are located in step 190. As the PostScript® interpreter does not need the entire set of tables, only a subset of the tables is extracted to improve processing efficiency. The process 140 emits a synthesized table directory reflecting of a subset of the tables (step 192). The synthesized table directory may include a subset of Type 42 tables such as control value table (CVT), font program (FPGM), glyph data (GLYF), font header (HEAD), horizontal header (HHEA), horizontal metrics (HMTX), index to location (LOCA), maximum profile (MAXP), and control value program (PREP), among others. From step 192, the process 140 then emits a synthesized table with the exception of a table for GLYF types (step 194). Finally, the process 140 emits the GLYF Type table (step 196). The GLYF table is handled as a special case due to the PostScript® interpreter's requirement that large blocks of data be presented on double-byte word boundaries. Due to the size of the GLYF table, it is parsed and emitted separately in step 196.

Figure 6:
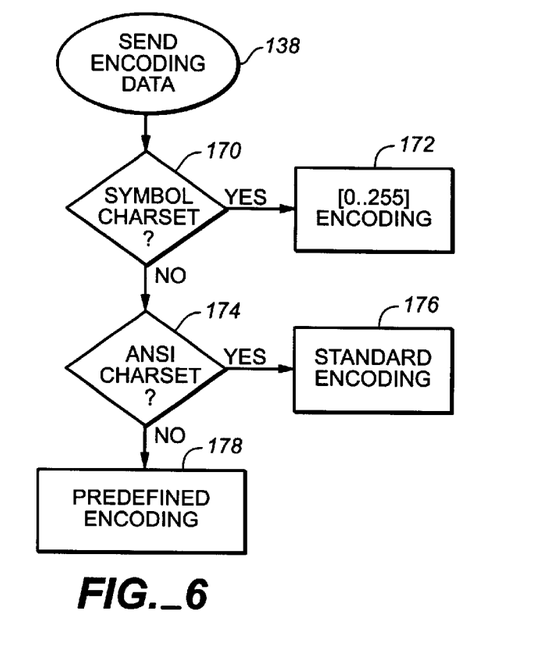
FIG. 6 is a flow chart illustrating in more detail a process for encoding font character set information.

Turning now to FIG. 6, step 138 for sending and encoding data of FIG. 3 is shown in more detail. The process first determines whether a character set for the font is of a symbol type (step 170). If the font belongs to a symbol character set, a default [0 . . . 255] encoding format is selected (step 172) where glyphs zero through 255 are selected as defaults for the symbols.

Alternatively, in the event that the font's character set is not the symbol character set in step 170, the process 138 further determines whether the font belongs to an ANSI character set (step 174). If the font belongs to an ANSI character set, a string may be emitted using a standard encoding method to tell the PostScript® interpreter that the font should use the ANSI character set (step 176). Alternatively, a predefined encoding is used in step 178. The predefined encoding is applicable when the font is part of a language that uses non-English characters or symbols, such as Hebrew. In this case, for each possible character set or each possible language, a default encoding may be used for that language. As predefined encodings are available on a language-by-language basis, one proper predefined encoding type is selected for the particular language.

Figures 7, 8:
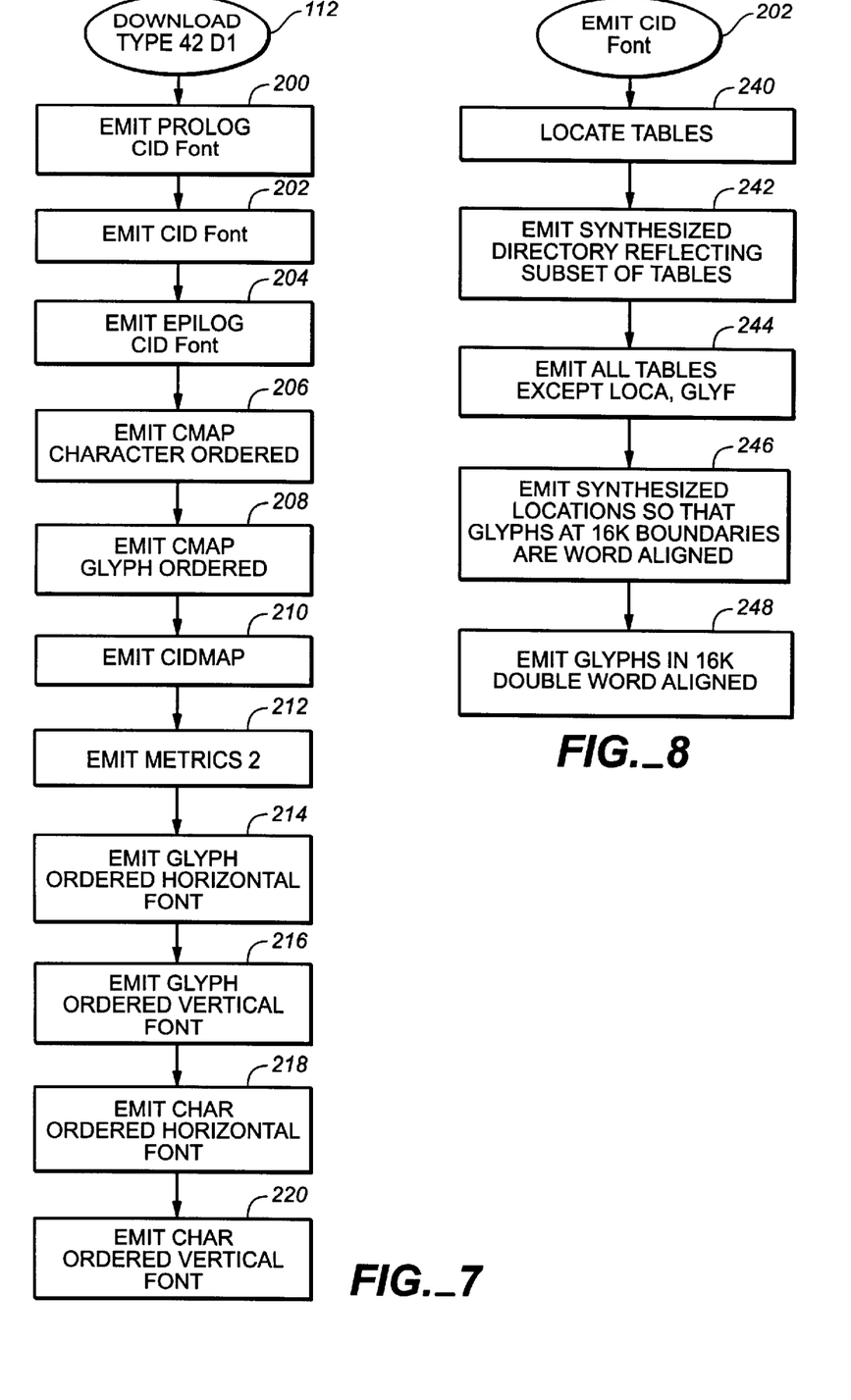
FIG. 7 is a flow chart of a process for downloading Type 42 D1 fonts.
FIG. 8 is a flow chart illustrating in more detail a process for emitting a CIDFont.

Turning now to FIG. 7, step 112 of FIG. 1 to download a Type 42 D1 font is shown in more detail. The Type 42 D1 font uses a double-byte character set, specifically a Far Eastern font Type 42. The preferred structure for handling the double-byte character set is a structure for the PostScript® CIDFont. Thus, the process 112 emits a prolog information specific to the CIDFont in step 200. Next, the CIDFont is emitted (step 202), as shown in more detail in FIG. 8. The process 112 then emits a CID log of the CIDFont (step 204) to confirm that the CIDFont was actually generated by the printer.

In steps 206–212, data specific to the PostScript® CIDFont specification are emitted. For instance, a character map (CMAP) of the ordered character set is emitted (step 206). Additionally, a CMAP of the ordered glyphs is emitted (step 208). The process of step 112 also emits a CID map (CIDMAP) (step 210) and METRICS data in step 212. The CMAP and the CIDMAP information relate to transformations in the order and selection of items in the CIDFont, while the METRICS information specifies various vertical character metrics that address vertical advancement values for the font.

Finally, glyph-ordered horizontal fonts are emitted (step 214) before the glyph-ordered vertical fonts are emitted (step 216). Additionally, character-ordered horizontal fonts are emitted in step 218 before character-ordered vertical fonts are emitted (step 220). In this manner, complex fonts such as Far Eastern fonts with a large number of glyphs are emitted using the Postscript® CIDFont. The way that data is presented to the printer is thus modified to account for the CIDFont convention. Also, data is emitted as character ordered data or glyph ordered data to allow drivers and/or applications to have more control over the font to be used if the application and/or driver software knows about that font. For instance, the glyph ordered font information may be used by the application and/or driver software when it desires to use a particular glyph without referencing the font that the glyph is associated with. Additionally, the character ordered font information may be used by the application and/or driver software to directly specify that a character be used across all fonts. Further, it is to be noted that although FIG. 7 shows one order of emission, any arbitrary order of data emission may be suitably used. For instance, glyph ordered emissions may occur before or after character ordered emissions.

Referring now to FIG. 8, the process 202 for emitting the CIDFont is shown. The process of FIG. 8 initially locates the tables (step 240). It then emits a synthesized directory reflecting a subset of the located table (step 242). All tables are then emitted, with the exception of a LOCA table and a GLYF table (step 244). The LOCA and GLYF tables are handled separately since the number of glyphs tends to be quite large in the CIDFont. Thus, a double word (D-word) is needed to contain all glyphs. The D-word format necessitates D-word alignment operations on the LOCA and GLYF tables.

The process 202 eventually emits the synthesized LOCA and GLYF at 16 kilobyte boundaries so that the GLYF transmitted in a D-word aligned manner (step 246). Finally, the glyphs are emitted in 16 kilobyte blocks, D-word aligned manner (step 248).

Figure 9:
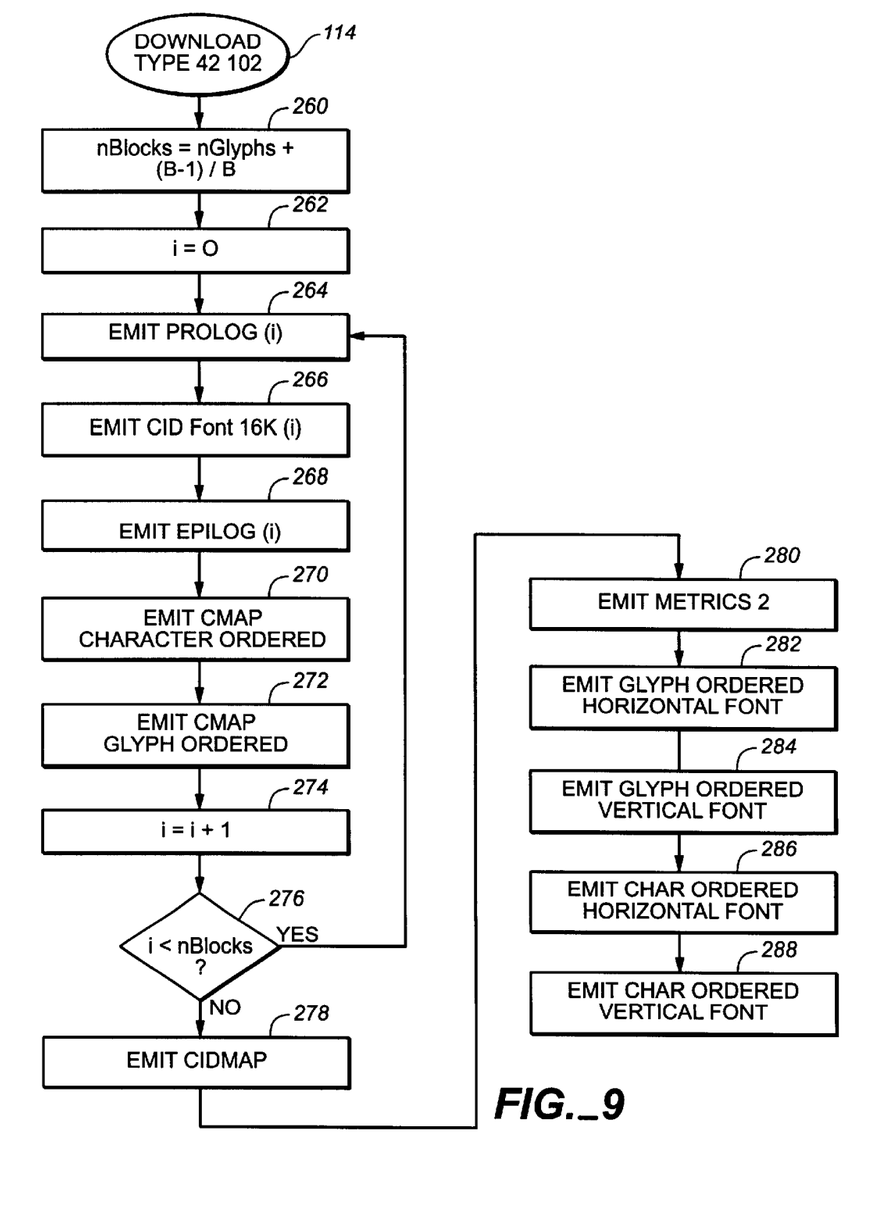
FIG. 9 is a flow chart illustrating a process for downloading Type 42 D2 fonts.

Turning now to FIG. 9, step 114 of FIG. 1 for downloading a Type 42 D2 font is detailed. PostScript® interpreters are not able to render glyphs located beyond a 16K boundary. Therefore, fonts that have more than 16K glyphs are broken into blocks or chunks that have less than 16K glyphs. Each block is downloaded to the PostScript® printer as an individual font. Finally, a program is downloaded to the printer to instruct the printer to stitch the blocks together. The process initially determines the number of blocks required as a function of the number of GLYFs and an arbitrary number B. Specifically, the number of blocks nBLOCKS is determined by the following equation:

$$nBLOCKS = \frac{nGLYFS + (B-1)}{B}$$

where B is an arbitrary number that is between 1 and 16K.

From step 260, the process clears an index variable i (step 262). Next, it emits a prolog that is associated with the index i (step 264). An ID font that is associated with the index i also emitted in step 266, as is an epilog associated with the index i (step 268).

Moreover, the process 114 emits a CMAP that is ordered by character (step 270). Similarly, the process 114 emits a CMAP that is ordered by GLYF (step 272). Next, the index variable i is incremented (step 274). Further, the process checks whether or not the index variable i has reached its maximum limit (step 276). If not, the process 114 loops from step 276 back to step 264 to continue the glyph downloading process.

Alternatively, if all the information associated with a glyph has been processed, the process of FIG. 9 then emits a CIDMap (step 278). It then emits METRICS data (step 280). Further, one or more GLYF-ordered horizontal fonts are emitted (step 284) before one or more GLYF-ordered vertical fonts are emitted (step 284). Similarly, one or more character-ordered horizontal fonts are emitted (step 286) before the character font ordered vertical fonts are emitted (step 288).

Figure 10:
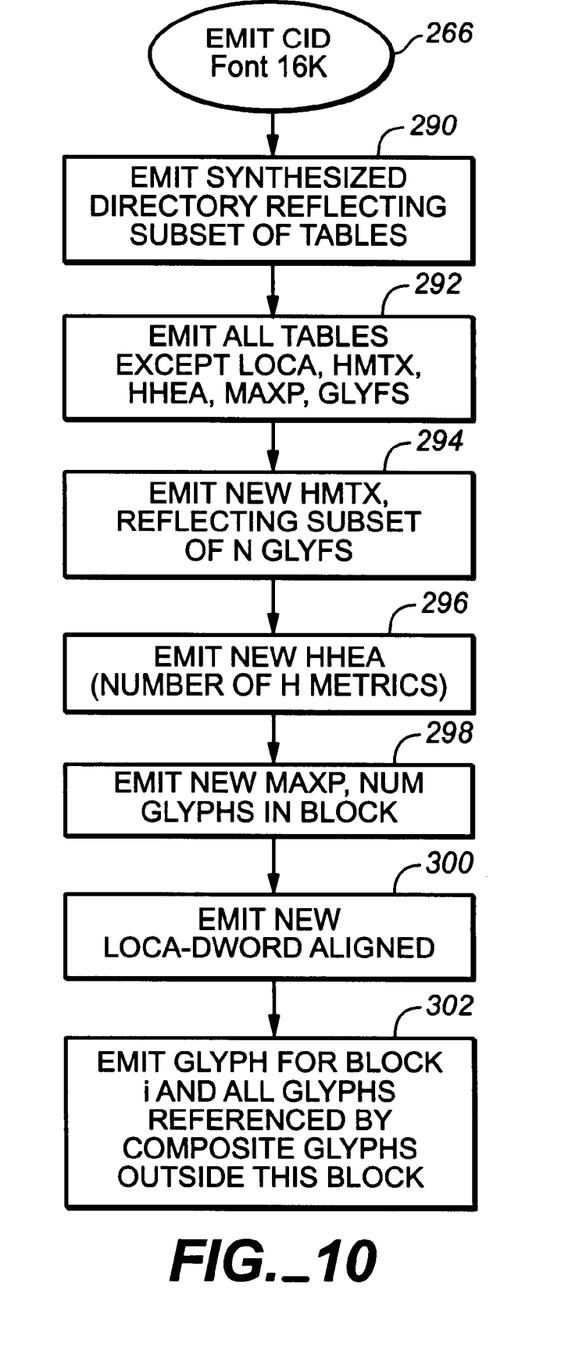
FIG. 10 is a flow chart illustrating in more detail a process for emitting the CIDFont.

Referring now to FIG. 10, the process 266 to emit the CIDFont in 16K blocks or chunks of glyphs is shown in more detail. The process 266 initially emits a synthesized directory reflecting a subset of the table (step 290). In this process, only a few tables, including the LOCA, HMTX, HHEA, MAXP and GLYF tables, change. Hence, all tables are emitted, with the exception of LOCA, HNTX, HHEA, MAXP and GLYF tables which are handled separately (step 292). A new HMTX table reflective of a subset of N GLYFs is emitted (step 294). The original HMTX table contains entries for every glyph needed and whose glyph count may exceed 16K. The new HTMX table only reflects a portion of the glyph, up to the 16K limit, in the current chunk.

Correspondingly, a new HHEA table reflective of a subset of a number of H METRICS is emitted (step 296). The HHEA table has a value in it which denotes the number of horizontal metrics entries. This value is updated in step 296. Similarly, a new MAXP table with an entry updated to reflect the new number of GLYFs is emitted (step 298). Further, new LOCA table is emitted in a double word aligned manner (step 300). Moreover, new glyphs are emitted for the current block as well as for all GLYFs referenced by composite glyphs outside the current block (step 302).

Figure 11:
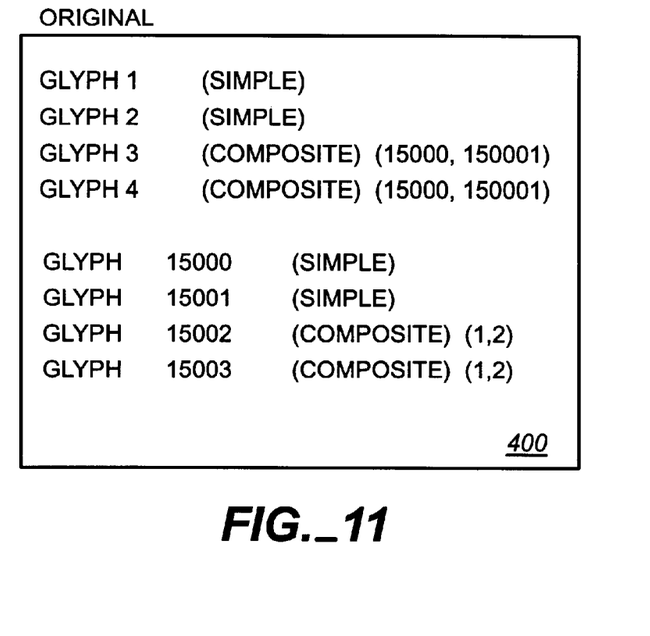
FIGS. 11 and 12 illustrate a stitching operation to allow glyphs resident in one block to reference glyphs resident in another block.
Figure 12:
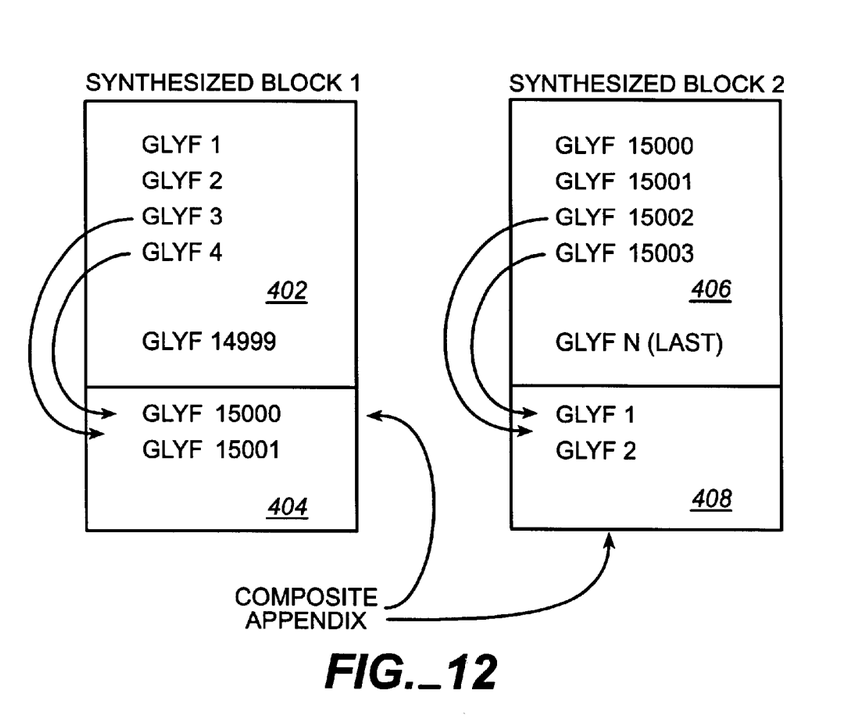

FIGS. 11 and 12 illustrate a stitching operation that is performed when GLYFs from one block reference a GLYF that resides in another block. FIG. 11 shows an original list of GLYFs 400, including a GLYF 1 which is a simple type and GLYF 2 which is also a simple type. Further, GLYFs 3 and 4 are classified as a composite GLYF type, which is specified in terms of one or more simple GLYF types. The list 400 ends with GLYF 14,999.

In FIG. 12, the original list 400 is broken down as synthesized Block 1 and 2. Block 1 contains a list 402 containing GLYFs 3 and 4 which reference a simple GLYF 15,000 in a composite appendix 404. The composite appendix 404 also references a GLYF 15,001, classified as the simple type. The GLYF 15,000 actually resides in the synthesized Block 2. The composite area 404 is thus a reserved area containing referenced glyphs that would have normally lived outside the block containing the list 402.

Similarly, the synthesized Block 2 contains a list 406. The list 406 contains a plurality of GLYFs 15000-GLYF N, which is the last GLYF to be transmitted. Moreover, the GLYFs 15002 and 15003 refers to a GLYF 1 which actually belongs to the synthesized Block 1. To ensure that the PostScript® interpreter can interpret the font even though some of the glyphs making up the font may not be resident in the same block, the composite appendices 404 and 408 contain any glyphs that are referenced that are outside or would have been outside of the current block. The appendices 404 and 408 thus allow GLYPHs in separate blocks to be stitched together. In this manner, the composite appendices 404 and 408 act as a caching buffer to support complex fonts that require a plurality of data storage blocks to store all glyphs.

The techniques described here may be implemented in hardware or software, or a combination of the two. Preferably, the techniques are implemented in computer programs executing on programmable computers that each includes a processor, a storage medium readable by the processor (including volatile and nonvolatile memory and/or storage elements), and suitable input and output devices. Program code is applied to data entered using an input device to perform the functions described and to generate output information. The output information is applied to one or more output devices.

Figure 13:
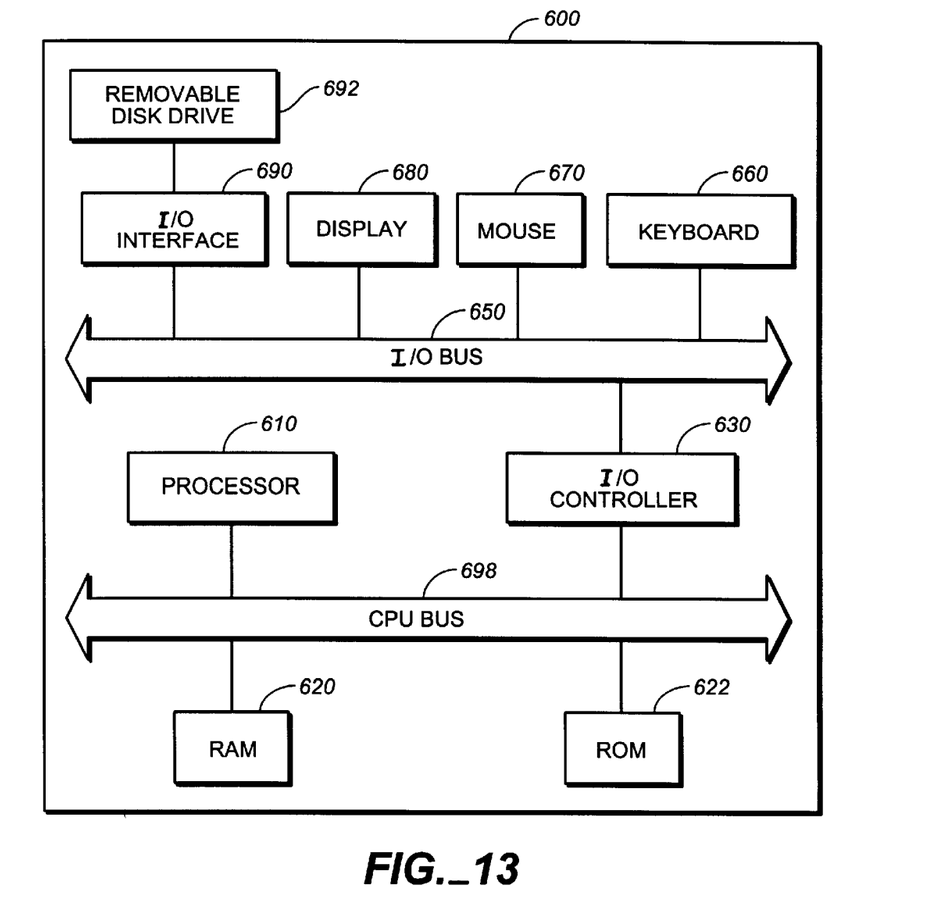
FIG. 13 is a schematic illustration of a computer system suitable for downloading fonts to a printer.

FIG. 13 illustrates one such computer system 600, including a CPU 610, a RAM 620, a ROM 622, and an I/O controller 630 coupled by a CPU bus 698. The I/O controller 630 is also coupled by an I/O bus 650 to input devices such as a keyboard 660 and a mouse 670, and output devices such as a monitor 680 and an I/O interface 690 which drives a disk drive 692.

Figure 14:
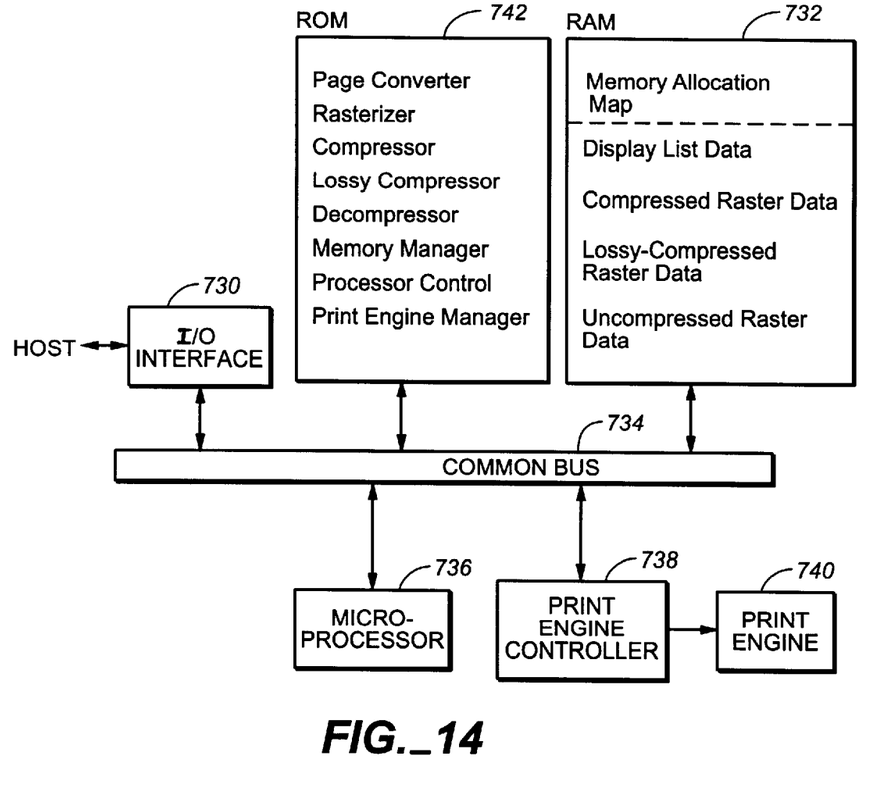
FIG. 14 is a schematic illustration of a printer for receiving fonts.

FIG. 14 shows a typical printer driven by the computer system 600. Referring to FIG. 14, a printer embodying the invention includes an input/output (I/O) interface 730 for receiving page description language commands over a cable or network from the host computer which outputs page description language commands to the common bus 734. Error messages and control information relating to the transfer of data is communicated back to the host via the I/O interface 730. As each page description language command is received, it is stored in random access memory (RAM) 732 over the common bus 734. A microprocessor 736 on the common bus 734 provides the computation and control for generating raster data and supplying the raster data to the print engine controller 738, which in turn passes the raster data to the electromechanical print engine 740 that applies the image to paper.

The program for the microprocessor 736 is permanently stored in a read-only memory (ROM) 742. Input data, intermediate results including the intermediate page representations, the raster buffer data for the current decompressed strip to be sent to the print engine controller and all other variable data are stored in shared RAM 732.

The microprocessor 736, ROM 742, RAM 732 and common bus 734 work together as a raster generator to convert the input page description language commands to raster data driving print engine controller 738. A standard commercial microprocessor, such as the Motorola 68000 family or the Intel i960 family may be used as the microprocessor 736. The RAM 732 is built using conventional dynamic random access memory (DRAM) semiconductor chips. Other required components are conventional commercial digital semiconductor chips or application specific integrated circuits (ASICs) known in the art and used with printed circuit interconnection technology.

Variations are within the scope of the following claims. For example, instead of using a mouse as the input devices to the computer system 600, a pressure-sensitive pen or tablet may be used to generate the cursor position information. Moreover, each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

While the invention has been shown and described with reference to an embodiment thereof, those skilled in the art will understand that the above and other changes in form and detail may be made without departing from the spirit and scope of the following claims.

What is claimed is:

1. A method for transmitting a font available on a computer to an output device supporting a page description language, said page description language having a download format, said font being characterizable by a plurality of glyphs and defining a character set, comprising:
   determining whether each character in the character set can be represented in a first storage capacity and if so, downloading the font to the output device using a first font format; and otherwise
   determining whether the number of glyphs in the font is below a threshold and
   if so, downloading the font to the output device using the download format; and
   if not, breaking the font glyph data into one or more blocks of glyph data, each of said block having fewer glyphs than the threshold and downloading the blocks to the output device using the download format.

2. The method of claim 1, wherein the first storage capacity is one byte.

3. The method of claim 1, wherein the threshold is $2^{14}$ glyphs.

4. The method of claim 1, further comprising generating unique identification data for the downloaded font to allow glyphs to be cached across print jobs.

5. The method of claim 1, wherein the downloading of the first font format downloads an encoded character set to the printer.

6. The method of claim 1, wherein the page description language is PostScript®.

7. The method of claim 6, wherein the download format is a Postscript® CIDFont format.

8. The method of claim 7, further comprising creating CIDFont character maps and CIDFont fonts according to a vertical or a horizontal line layout of the font available from an operating system.

9. The method of claim 7, further comprising creating CIDFont character maps and CIDFont fonts which support glyph-index based access and character based access.

10. The method of claim 9, wherein the creating CIDFont character maps and CIDFont fonts further comprises creating glyph-ordered vertical and horizontal fonts.

11. The method of claim 9, wherein the creating CIDFont character maps and CIDFont fonts further comprises creating character ordered vertical and horizontal fonts.

12. The method of claim 1, wherein the glyphs have simple glyphs and composite glyphs that reference other simple glyphs, further comprising:
   detecting composite glyphs referenced by a current block; and
   duplicating the referenced composite glyphs from other blocks into the current block.

13. The method of claim 12, further comprising stitching the referenced composite glyphs together with glyphs in the current block to define all composite glyphs in the output device.

14. The method of claim 1, wherein the font downloading further comprises compressing the font-data.

15. The method of claim 14, wherein the font downloading encodes the font as ASCII85 encoding.

16. The method of claim 1, wherein the page description language is Postscript® and wherein the download font is a CIDFont download format.

17. The method of claim 1, wherein the output device further comprises a data storage device receiving the downloaded font.

18. The method of claim 17, wherein the data storage device is a disk.

19. The method of claim 17, wherein the data storage device is a random access memory (RAM) drive.

20. An apparatus for transmitting a font available from a computer system to an output device capable of interpreting a page description language, said page description language having a download format, said font having a character set and characterized by a plurality of glyphs, comprising:
   a processor;
   a communication port coupled to the processor and coupleable to the output device;
   a data storage device coupled to the processor and containing code for:
      determining whether the character set can be represented in a first storage capacity and if so, downloading the font to the output device using a first font format; and otherwise
      determining whether the number of glyphs in the font is below a threshold and
      if so, downloading the font to the output device using the download format; and otherwise
      breaking the font glyphs into one or more blocks of glyphs, each of said block having fewer glyphs than the threshold and downloading the blocks to the output device using the download format.

21. The apparatus of claim 20, wherein the code for downloading of the first font format downloads an encoded character set to the printer.

22. The apparatus of claim 20, wherein the page description language is PostScript®.

23. The apparatus of claim 22, wherein the download format is a PostScript® CIDFont format.

24. The apparatus of claim 23, further comprising code for creating CIDFont character maps and CIDFont fonts which render glyphs according to a vertical line layout of the font available from the operating system.

25. The apparatus of claim 23, further comprising code for creating CIDFont character maps and CIDFont fonts which support glyph index based access and character based access.

26. The apparatus of claim 25, wherein the code for creating CIDFont character maps and CIDFont fonts further comprises code for creating glyph ordered vertical and horizontal fonts.

27. The apparatus of claim 25, wherein the code for creating CIDFont character maps and CIDFont fonts further comprises code for creating character ordered vertical and horizontal fonts.

28. The apparatus of claim 20, wherein the glyphs have simple glyphs and composite glyphs that reference other simple glyphs, further comprising:

code for detecting composite glyphs referenced by a current block; and code for duplicating the referenced composite glyphs from other blocks into the current block.

29. The apparatus of claim 28, further comprising code for stitching the referenced composite glyphs together with glyphs in the current block to avoid glyph inconsistencies.

30. The apparatus of claim 20, wherein the code for font downloading further comprises code for compressing the font.

31. The apparatus of claim 20, wherein the code for font downloading encodes the font using ASCII85 encoding.

32. A computer readable medium with instructions for transmitting a font available on a computer to an output device supporting a page description language, said page description language having a download format, said font having a character set and characterized by a plurality of glyphs, comprising:

code for determining whether the character set can be represented in a first storage capacity and if so, downloading the font to the output device using a first font format; and code for determining whether the number of glyphs in the font is below a threshold and if so, downloading the font to the output device using the download format; and otherwise breaking the font glyph data into one or more blocks of glyph data, each of said block having fewer glyphs than the threshold and downloading the blocks to the output device using the download format.

33. The computer readable medium of claim 32, wherein the first storage capacity is a byte.

34. The computer readable medium of claim 32, wherein the threshold is $2^{14}$ glyphs.

35. The computer readable medium of claim 28, wherein the font is a TrueType font.

36. The computer readable medium of claim 32, wherein the downloading code of the first font format downloads an encoded character set to the printer.

37. The computer readable medium of claim 32, wherein the page description language is PostScript®.

38. A method for transmitting a font available on a computer to an output device supporting a PostScript® page description language, said PostScript® page description language having a CIDFont download format, said font having a character set and characterized by a plurality of glyphs, comprising:

determining whether the character set can be represented in a byte and if so, downloading the font to the output device using the PostScript® format; and otherwise determining whether the number of glyphs in the font is below $2^{14}$ and if so, downloading the font to the output device using the CIDFont format; and otherwise breaking the font glyph data into one or more blocks of glyph data, each of said block having less than 16K glyphs and downloading the blocks to the output device using the CIDFont format.

39. A method for transmitting a font available on a computer to an output device supporting a PostScript® page description language, said PostScript® page description language having a CIDFont download format, said font having a character set and characterized by a plurality of glyphs, comprising:

breaking the font glyph data into one or more blocks of glyph data;

downloading the blocks to the output device using the PostScript® CIDFont format; and in the output device, stitching the referenced composite glyphs together with glyphs in the current block to define all composite glyphs.

* * * * *